(12) United States Patent
Wu et al.

(10) Patent No.: US 8,995,754 B2
(45) Date of Patent: Mar. 31, 2015

(54) ESTIMATING A POSE OF A CAMERA FOR VOLUME ESTIMATION

(71) Applicant: Xerox Corporation, Norwalk, CT (US)

(72) Inventors: Wencheng Wu, Webster, NY (US); Edgar A. Bernal, Webster, NY (US); Lalit Keshav Mestha, Fairport, NY (US); Paul R. Austin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 13/905,788

(22) Filed: May 30, 2013

(65) Prior Publication Data

US 2014/0355820 A1    Dec. 4, 2014

(51) Int. Cl.
*G06K 9/00* (2006.01)
*G06T 7/00* (2006.01)

(52) U.S. Cl.
CPC .................................... *G06T 7/004* (2013.01)
USPC ........................................................ 382/154

(58) Field of Classification Search
None
See application file for complete search history.

(56) References Cited

U.S. PATENT DOCUMENTS

| | | | |
|---|---|---|---|
| 2006/0008268 A1* | 1/2006 | Suwa | 396/310 |
| 2007/0052698 A1* | 3/2007 | Funayama et al. | 345/419 |
| 2011/0221861 A1* | 9/2011 | Jeon et al. | 348/42 |
| 2012/0098937 A1* | 4/2012 | Sajadi et al. | 348/46 |
| 2013/0201291 A1* | 8/2013 | Liu et al. | 348/47 |

OTHER PUBLICATIONS

Mestha et al., "3D Imaging Using Structured Light for Accurate Vehicle Occupancy Determination", U.S. Appl. No. 13/476,334, filed May 21, 2012.
Woo et al., "Automatic portion estimation and visual refinement in mobile dietary assessment", Purdue University, 2010.
Xu et al., "Contemporaneously Reconstructing Images Captured of a Scene Illuminated With Unstructured and Structured Illumination Sources", U.S. Appl. No. 13/533,678, filed Jun. 26, 2012.
Yue et al., "Measurement of Food Volume Based on Single 2-D Image Without Conventional Camera Calibration", IEEE EMBS, Aug. 28, 2012, pp. 2166-2169.

* cited by examiner

*Primary Examiner* — Stephen R Koziol
*Assistant Examiner* — Amandeep Saini
(74) *Attorney, Agent, or Firm* — Philip E. Blair; Fleit Gibbons Gutman Bongini & Bianco P.L.

(57) ABSTRACT

What is disclosed a system and method for estimating a position (or pose) of a camera relative to a surface upon which an object rests in an image captured by that camera such that a volume can be estimated for that object. In one embodiment, a matrix K is determined from parameters intrinsic to a camera used to capture image. An amount of a camera translation T is determined with respect to a set of real-world coordinates in (X,Y,Z). An amount of a camera rotation matrix R is determined from camera angles measured with respect to the real-world coordinates. A distance $Z_c$ of the camera at location (i,j) can then be estimated. A volume of the object in an image of that object can be estimated from the camera pose.

16 Claims, 4 Drawing Sheets

ESTIMATING A POSE OF A CAMERA FOR VOLUME ESTIMATION

TECHNICAL FIELD

The present invention is directed to systems and methods for estimating a position (or pose) of a camera relative to a surface upon which an object rests in an image captured by that camera such that a volume can be estimated for that object.

BACKGROUND

Efforts have been expended in determining a volume from an image. For instance, "*Automatic Portion Estimation And Visual Refinement In Mobile Dietary Assessment*", Woo et al, Proceedings of the SPIE, Vol. 7533, (January 2010), discloses a technique for processing an image acquired by a RGB camera to estimate a volume of a food item captured in that image using camera calibration, image processing, volumetric modeling, and interactive user refinements to obtain that estimation. In another method disclosed in: "*Measurement of Food Volume Based on Single 2-D Image without Conventional Camera Calibration*", by Y. Yue, W. Jia and M. Sun, 34th Annual Intl Conf. of IEEE EMBS, San Diego, Calif. USA, (August 2012), an image capture by a RGB camera is processed to estimate food volume. These approaches require the image to be acquired under tightly constrained conditions regarding the camera's position (or pose) relative to the food item or the use of a reference/calibration target with known physical dimensions, so that volume can be accurately estimated. Before this technology can be widely employed for general use, methods are needed for accurately estimating the pose of the camera used to acquire images of an object for which a volume is intended to be estimated.

Accordingly, what is needed in this art is a system and method for estimating a position (or pose) of a camera relative to a surface upon which an object rests in an image captured by that camera such that a volume can be estimated for that object.

INCORPORATED REFERENCES

The following U.S. Patents, U.S. Patent Applications, and Publications are incorporated herein in their entirety by reference.

"Contemporaneously Reconstructing Images Captured Of A Scene Illuminated With Unstructured And Structured Illumination Sources", U.S. patent application Ser. No. 13/533,678, by Xu et al.

"3D Imaging Using Structured Light For Accurate Vehicle Occupancy Determination", U.S. patent application Ser. No. 13/476,334, by Mestha et al.

BRIEF SUMMARY

What is disclosed is a system and method for estimating a position (or pose) of a camera relative to a surface upon which an object rests in an image captured by that camera such that a volume can be estimated for that object. In one embodiment, a matrix K is determined from parameters intrinsic to a camera used to capture image. An amount of a camera translation T is determined with respect to a set of real-world coordinates in (X,Y,Z). An amount of a camera rotation matrix R is determined from camera angles measured with respect to the real-world coordinates. A distance $Z_c$ of the camera at location (i,j) can then be estimated. A volume of the object in the image can be estimated from the camera pose parameters.

Features and advantages of the present method will become apparent from the following detailed description and accompanying drawings.

BRIEF DESCRIPTION OF THE DRAWINGS

Advantages of the subject matter disclosed herein will become apparent from the following description in conjunction with the accompanying drawings, in which.

DETAILED DESCRIPTION

What is disclosed is a system and method for estimating a position (or pose) of a camera relative to a surface upon which an object rests in an image captured by that camera such that a volume can be estimated for that object.

Figure 1:
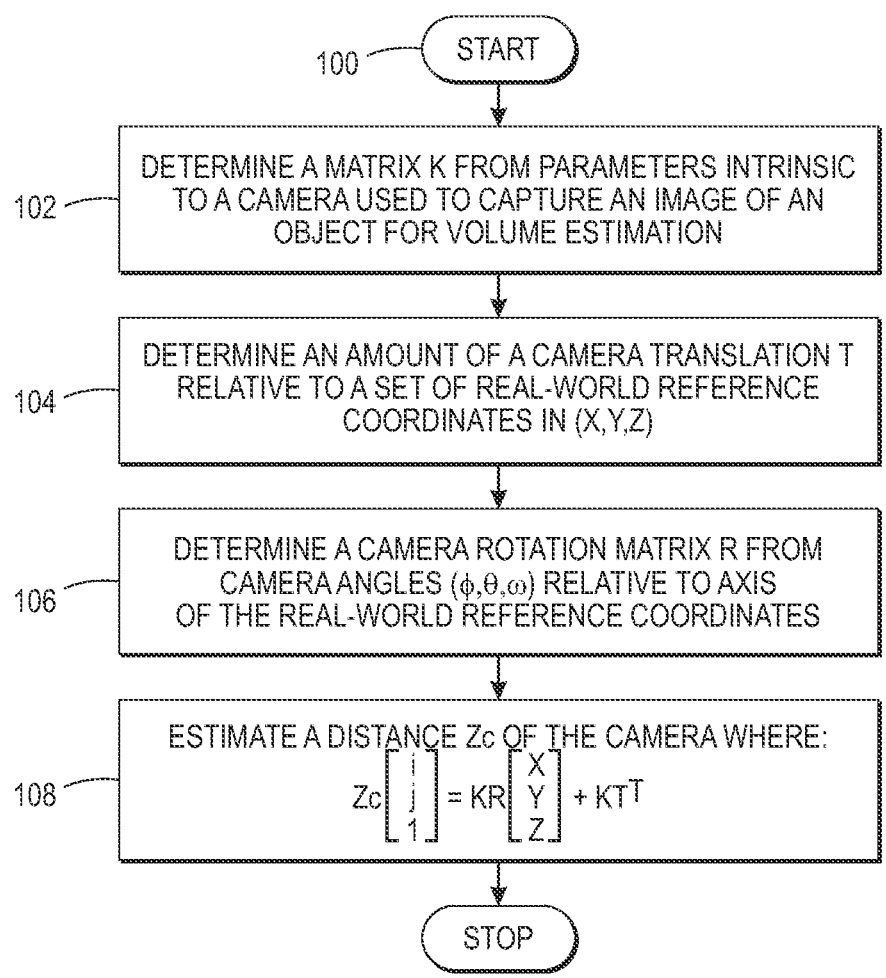
FIG. 1 which illustrates one example embodiment of the present method for estimating a pose of a camera relative to a surface upon which a 3D object rests for volume estimation purposes.

Reference is being made to the flow diagram of FIG. 1 which illustrates one example embodiment of the present method. Flow processing starts at step 100 and immediately proceeds to step 102.

Figure 2:
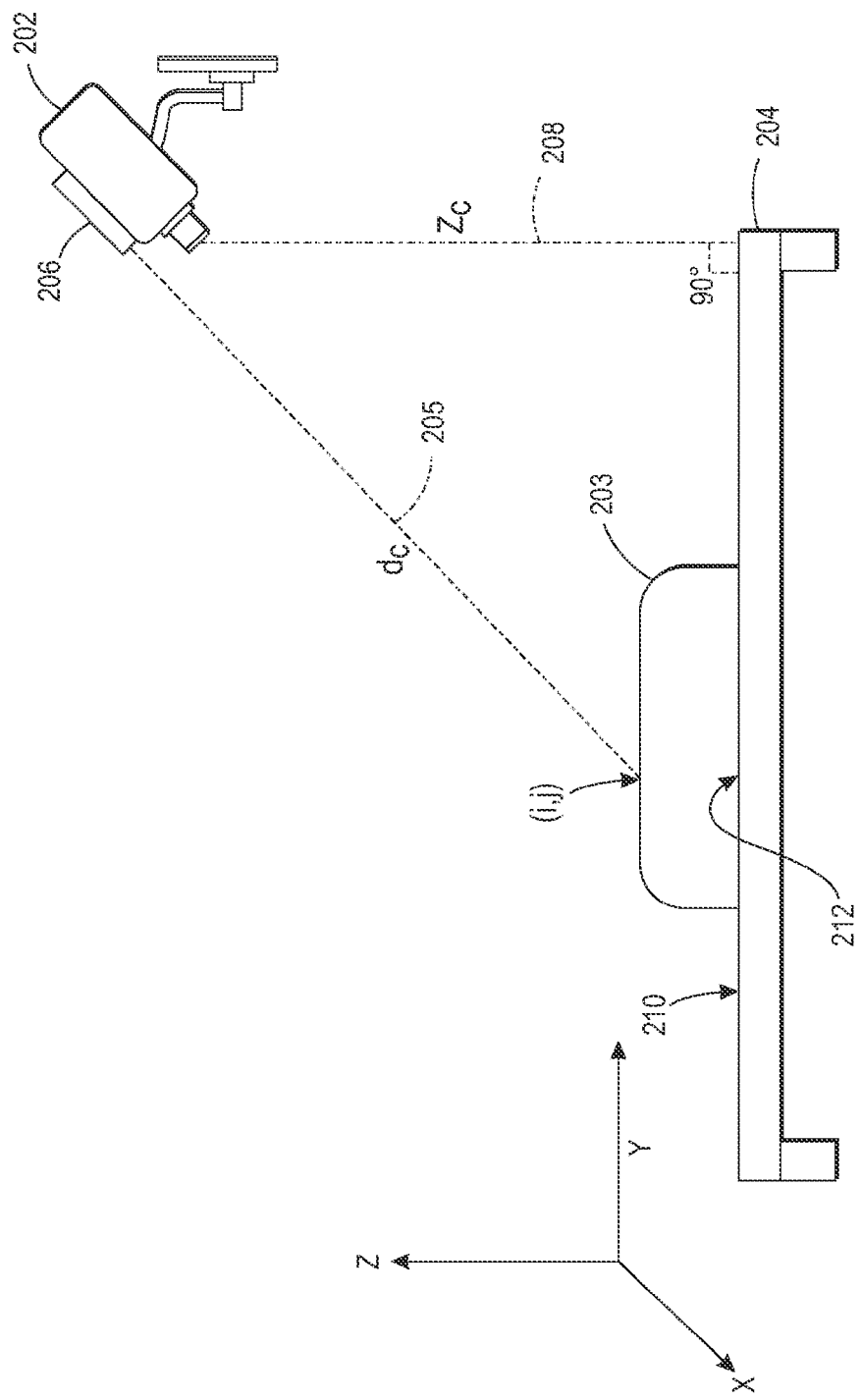
FIG. 2 shows a camera used to capture an image of an object resting on a horizontal surface such that a volume can be estimated for that object.

Step 102, determine a matrix K from parameters intrinsic to the camera used to capture at least one image of an object for volume estimation purposes. FIG. 2 shows a camera 202 used to capture an image of an object 203 resting on a flat surface 204 such that a volume can be estimated for that object. The methods hereof estimate a distance $d_c$ (205) of the camera from surface location (i,j) as measured by depth sensor 206. Object 203 may be, for example, a food item. In one embodiment, matrix K is given by:

$$K = \begin{bmatrix} f_1 & \alpha f_1 & c_1 \\ 0 & f_2 & c_2 \\ 0 & 0 & 1 \end{bmatrix},$$

where $f_1$ and $f_2$ are focal lengths of a lens of the camera in each of two directions respectively, $\alpha$ is a non-zero skew of the camera's sensor, and $c_1$ and $c_2$ represent a center position of the camera in pixels. For a given camera, these parameters can be determined offline acquiring calibration targets and processing them via known camera calibration algorithms.

Step 104, determine a camera translation vector $T=[t_X t_Y t_Z]$ relative to a set of real-world reference coordinates in (X,Y,Z). Methods for translating 3D locations to a set of real world reference coordinates are well established.

Figure 3:
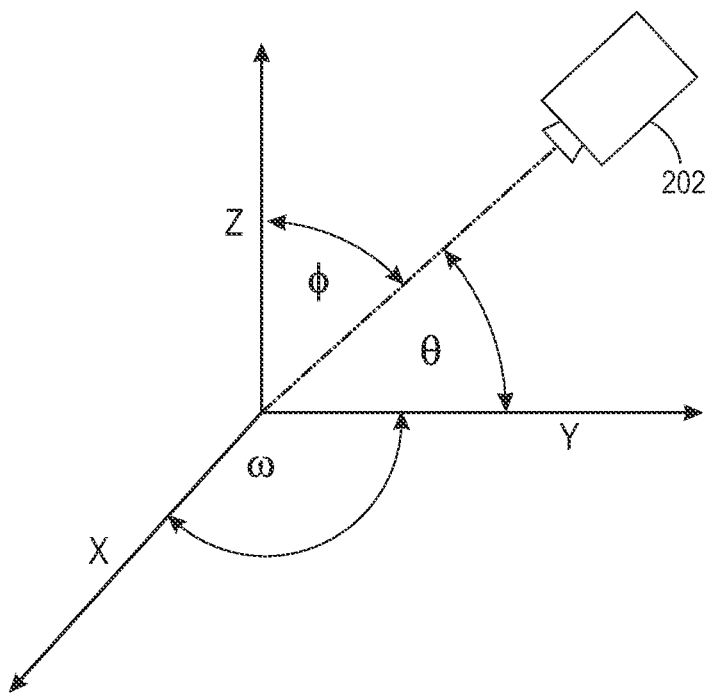
FIG. 3 shows the various camera angles $(\phi,\theta,\omega)$ relative to the X, Y and Z axis of a set of real-world reference coordinates.

Step 106, determine a camera rotation matrix R from camera angles $(\phi,\theta,\omega)$ relative to the X, Y and Z axis, respectively, of the real-world reference coordinates. FIG. 3 shows the various camera angles $(\phi,\theta,\omega)$ relative to the X, Y and Z axis of the real-world reference coordinates. In one embodiment, matrix R is given by:

$$R = \begin{bmatrix} 1 & 0 & 0 \\ 0 & \cos\varphi & -\sin\varphi \\ 0 & \sin\varphi & \cos\varphi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\omega & -\sin\omega & 0 \\ \sin\omega & \cos\omega & 0 \\ 0 & 0 & 1 \end{bmatrix}.$$

The amount of a camera translation and camera rotation is based upon depth values associated with pixels at locations on the surface of the object as measured by a depth sensor 206 or, as approximated, by a planar surface fitted to the measured depth values of the surface. In one embodiment, instructions are provided to a camera operator so that the camera rotation approximates a rotation angle any of: (90°, 90°, 0°), (90°, 0°, 90°), and (0°, 90°, 90°). Preferably, the images and depth maps acquired at such angles should be approximately centered relative to the position of the target object. More specifically, with respect to FIG. 2, the user would be instructed to aim the camera such that $Z_c$ and $d_c$ are approximately equal for the (90°, 90°, 0°) case.

Step 108, estimate a distance $Z_c$ from the camera to the table in the direction of the Z coordinate axis (208) of the camera, comprises solving the following system of equations:

$$Z_c \begin{bmatrix} i \\ j \\ 1 \end{bmatrix} = KR \begin{bmatrix} X \\ Y \\ Z \end{bmatrix} + KT^T.$$

The estimated distance can be communicated to a memory or to a remote device over a network for storage or for further processing. In this embodiment, processing stops.

Reference is now being made to FIG. 2. Given the estimated intrinsic and pose camera parameters (K,R,T), one can now compute the real-world coordinates XYZ, $X_S(i,j), Y_S(i,j), Z_S(i,j)$, of the flat surface 204 at each pixel location (i,j) using the above equation and the depth output $d_s(i,j)$ from the depth sensor 206. Pixel location 210 represents a location on the surface of surface 204 that is not occluded by object 203. Pixel location 212 represents a location of a pixel on surface 204 that is occluded by object 203. Note that the real-world coordinates of the points on the flat surface that are occluded by the object that rests on them can still be determined, for example by model-fitting a plane to the depth coordinates of the pixels that are not occluded by the object. Similarly, the real-world coordinates XYZ, $X_o(i,j), Y_o(i,j), Z_o(i,j)$, of the top surface of the object that rests on flat surface 204 can be determined in the same manner.

A volume V can then be estimated for the object in an image as follows:

$$V = \sum_{(i,j) \in \Omega} \Delta Z(i,j) \cdot \Delta X(i,j) \cdot \Delta Y(i,j)$$

where $\Omega$ is a set of pixel locations of the object in the image; $\Delta Z(i,j) = Z_s(i,j) - Z_o(i,j)$ is an angle-corrected delta between the depth of the surface of the object $d_o(i,j)$ at location (i,j) as measured by a sensor and the depth of the surface $d_s(i,j)$ at the (i,j) position as determined by the aforementioned plane fitting; and $\Delta X(i,j) = X_o(i,j) - X_o(i-1,j)$, $\Delta Y(i,j) = Y_o(i,j) - Y_o(i,j-1)$ are the physical sizes corresponding to the area imaged by pixel (i,j) in real-world coordinates, which are obtained by calculating the deltas along the X and Y axes between pixel (i,j) and its neighboring pixels. The angle correction delta $\Delta Z(i,j)$ is a function of $\cos\varphi$, $\cos\theta$, $\cos\omega$ and $d_s(i,j) - d_o(i,j)$.

It should be appreciated that the above volume formula assumes that the surface on which the object lies is flat. The derivations hereof can be extended to a non-flat surface if an approximation of the shape of the surface is available (e.g. a quadratic or spherical bowl). Another assumption implicit to the above computations is that the object to be measured is in full contact with the surface. This constraint can be relaxed to accommodate broader object classes if an approximation of the object shape is available (e.g. symmetry relative to the Z axis).

It should be appreciated that the flow diagrams hereof are illustrative. One or more of the operative steps may be performed in a differing order. Other operations may be added, modified, enhanced, or consolidated. Variations thereof are intended to fall within the scope of the appended claims. Various aspects of the method of FIG. 1 may be implemented in software which may include object or object-oriented structures and techniques. Such software may comprise portable code that can be executed on a variety of platforms and further may be implemented partially or fully in hardware operating in conjunction with software.

Block Diagram of Networked System

Figure 4:
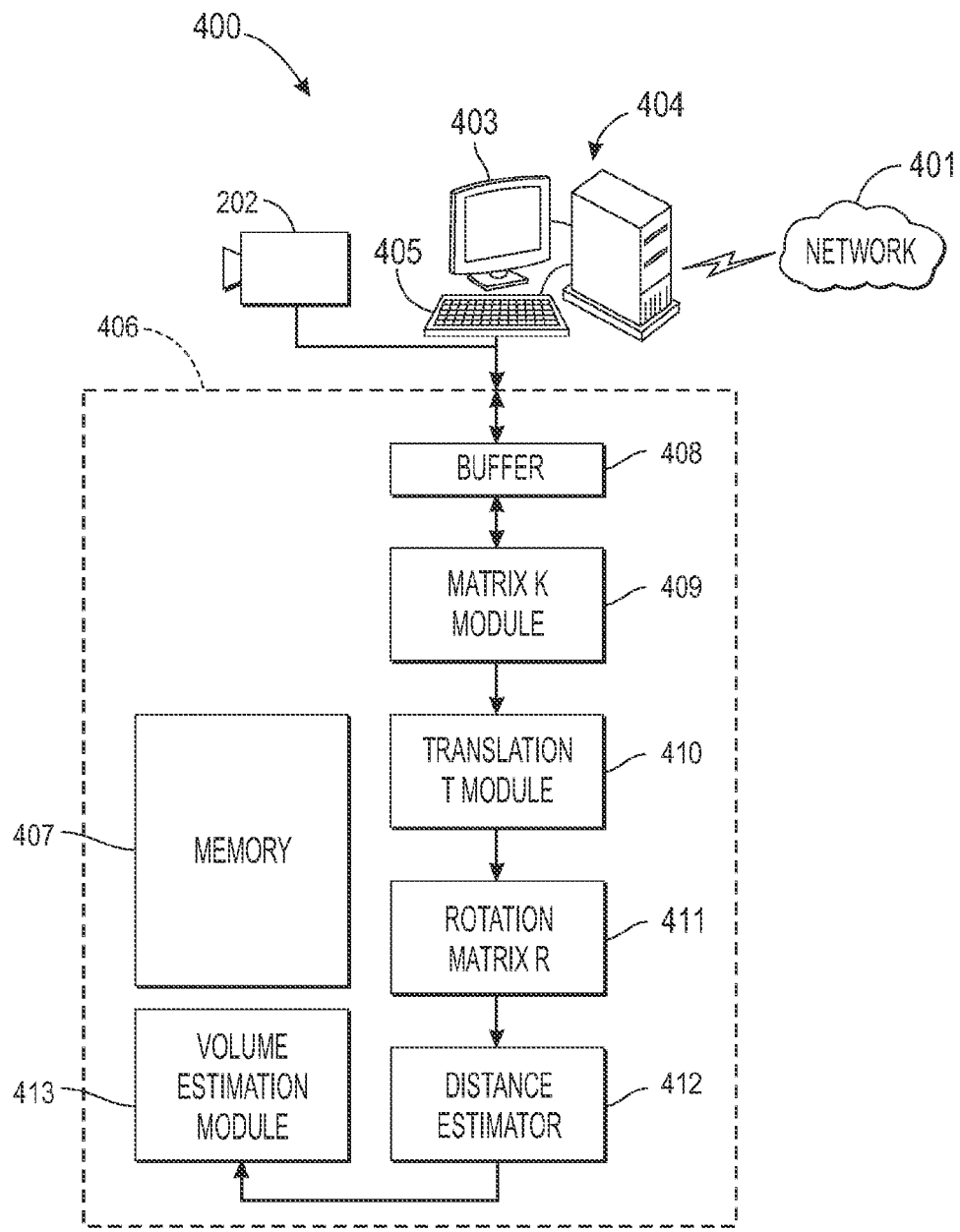
FIG. 4 illustrates a block diagram of one example system for implementing various aspects of the present method as described with respect to the flow diagram of FIG. 1.

Reference is now being made to FIG. 4 which illustrates a block diagram of one example system 400 capable of implementing various aspects of the present method as shown and described with respect to the flow diagram of FIG. 1.

The embodiment of FIG. 4 is shown comprising a workstation 404 in communication with a camera 202. The networked workstation 404 comprises a computer case housing a motherboard with a processor and memory, a communications link such as a network card, video card, an internal hard drive capable of reading/writing to machine readable media such as a floppy disk, optical disk, CD-ROM, DVD, magnetic tape, and other software and hardware needed to perform the functionality of a computing system. Workstation 401 has a monitor 403 for effectuating a user input or selection. The computer is also in communication with network 401 via a network communications interface (not shown). A user may use the keyboard 405 and monitor 403 of the workstation to identify or otherwise select areas of an image for processing or provide other user input required for the implementation hereof. Such information may also be retrieved by the workstation over a network 401. It should be appreciated that workstation 404 has specialized software configured to display alphanumeric values, menus, scroll bars, dials, slideable bars, pull-down options, selectable buttons, and the like, for entering, selecting, modifying, and accepting any information needed for processing the image. Software to configure a user interface or any portion thereof to display/enter/accept data is generally customizable. In the embodiment of the networked system of FIG. 4, computer workstation 404 and camera 202 are in communication with Processor 406 which executes machine readable program instructions for performing the methods hereof. Processor 406, and the various modules, memory, and sub-processors thereof, may reside in the camera 202 or the workstation 404.

Processor 406 is shown comprising a Memory 407 which provides storage for the processor and further stores data and mathematical formulas and representations to determine camera pose and for estimating a volume of an object in an image captured by the camera in accordance with the teachings hereof. All of the sub-processing modules of Processor 406 are in communication with Memory 407 via pathways not shown. Buffer 408 provides a means for storing information such as, for instance, regions of interest within an image being processed for volume estimation, mathematical values, the real-world reference coordinates in (X,Y,Z), distance measurements, rotation angles, the intrinsic parameters of the camera 202 such as focal lengths of the camera's lens, the value of a non-zero skew of the camera's sensor, and representations of a center position of the camera in pixels, and the like, as are needed processing. Matrix K Module 409 retrieves the camera's intrinsic parameters from Buffer 408 and facilitates a determination of matrix K which, in turn, is stored to Memory 407. Translation T Module 410 facilitates a determination of translation vector T which, in turn, is stored to Memory 407. Rotation Matrix R Module 411 facilitates a determination of rotation matrix R from camera angles ($\phi,\theta,\omega$) relative to the X, Y and Z axis, respectively, of the real-world reference coordinates, as shown by way of illustration in FIG. 3. The rotation matrix is stored to Memory 407. Distance Estimator 412 estimates a distance Z, of the camera in a manner as disclosed herein. The estimated distance is communicated to Memory 407 or to a remote device over network 401 for storage or for further processing. Volume Estimation Module 413 receives the distance values for each location (i,j) and estimates a volume V for the object as provided herein.

Any of the computational values, results, interim values, distances, locations, and the like, can be viewed on the monitor 403 where a user can view the displayed values and make a selection from menu options displayed thereon. A user or technician of the system of FIG. 4 may use the graphical user interface of the workstation to identify regions of interest, set parameters, use a rubber-band box to select image portions and/or regions of images for processing. These selections may be stored and retrieved as needed. Default settings and initial parameters can be retrieved from Memory 407, as needed. Although shown as a desktop computer, it should be appreciated that workstation 404 can be a laptop, a mainframe, a client/server, or a special purpose computer such as an ASIC, circuit board, dedicated processor, or the like. The embodiment of FIG. 4 is illustrative and may include other functionality known in the arts.

Any of the modules and processing units of FIG. 4 can be placed in communication with one or more devices over network 401. Various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated system and may be practiced in distributed computing environments where tasks are performed by remote devices that are linked through a network. It should be appreciated that some or all of the functionality performed by any of the modules or processing units of system 406 can be performed, in whole or in part, by a remote device placed in communication with system 400 over network 401. The embodiment shown is illustrative and should not be viewed as limiting the scope of the appended claims. Although shown as a computer workstation, it should be appreciated that workstation 404 can be a laptop, tablet, mainframe, client/server, smartphone, or a special purpose computer such as an ASIC.

It will be appreciated that the above-disclosed and other features and functions, or alternatives thereof, may be desirably combined into many other different systems or applications. The teachings hereof can be implemented in hardware or software using any known or later developed systems, devices, and/or software by those skilled in the applicable art without undue experimentation from the functional description provided herein with a general knowledge of the relevant arts. One or more of the capabilities hereof can be emulated in a virtual environment or leverage off-the-shelf computer graphics software such as that in Windows or Java.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications.

Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Changes to the above-described embodiments may be made without departing from the spirit and scope of the invention. The teachings of any printed publications including patents and patent applications, are each separately hereby incorporated by reference in their entirety.

What is claimed is:

1. A method for estimating a pose of a camera relative to a surface upon which a 3D object rests such that a volume can be estimated for that object in an image captured by that camera, the method comprising:

determining a matrix K from parameters intrinsic to a camera used to capture at least one image of an object for volume estimation purposes;

determining a camera translation vector $T=[t_X t_Y t_Z]$ relative to a set of real-world reference coordinates in (X,Y,Z);

determining a camera rotation matrix R from camera angles ($\phi,\theta,\omega$) relative to the X, Y and Z axis, respectively, of said real-world reference coordinates, wherein said camera translation and said camera rotation are determined from depth values associated with pixels of a surface of said object, said depth values being measured by a depth sensor of said camera; and estimating a distance $Z_c$ of said camera, comprising:

$$Z_c \begin{bmatrix} i \\ j \\ 1 \end{bmatrix} = KR \begin{bmatrix} X \\ Y \\ Z \end{bmatrix} + KT^T$$

wherein K comprises:

$$K = \begin{bmatrix} f_1 & \alpha f_1 & c_1 \\ 0 & f_2 & c_2 \\ 0 & 0 & 1 \end{bmatrix},$$

where $f_1$ and $f_2$ are focal lengths of a lens of said camera in each of two directions, $\alpha$ is a non-zero skew of a sensor of said camera, and $c_1$ and $c_2$ are center positions of said camera in pixels, and; wherein R comprises:

$$R = \begin{bmatrix} 1 & 0 & 0 \\ 0 & \cos\varphi & -\sin\varphi \\ 0 & \sin\varphi & \cos\varphi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\omega & -\sin\omega & 0 \\ \sin\omega & \cos\omega & 0 \\ 0 & 0 & 1 \end{bmatrix}.$$

2. The system of claim 1, wherein a 2-dimensional surface model is fitted to said measured depth values of said surface.

3. The method of claim 1, further comprising providing instructions to an operator of said camera to rotate said camera so that a rotation thereof approximates a rotation angle any of: (90°, 90°, 0°), (90°, 0°, 90°), and (0°, 90°, 90°), said instructions being based on a depth distribution of said surface.

4. The method of claim 1, further comprising computing the real-world coordinates XYZ of the surface at each pixel location (i,j), $X_S(i,j), Y_S(i,j), Z_S(i,j)$, or the real-world coordinates XYZ of an object rested on said surface at each pixel location (i,j), $X_O(i,j), Y_O(i,j), Z_O(i,j)$, using said equation in claim 1 and the depth output $d_s(i,j)$ or $d_O(i,j)$ from the depth sensor of said surface or said object in an image captured by said camera.

5. The method of claim 1, further comprising estimating a volume V of an object in an image captured by said camera, said volume comprising:

$$V = \sum_{(i,j)\in\Omega} \Delta Z(i,j) \cdot \Delta X(i,j) \cdot \Delta Y(i,j),$$

where $\Omega$ is a set of pixel locations of object in said image; $\Delta Z(i,j)=Z_s(i,j)-Z_o(i,j)$ is an angle-corrected delta between depth of surface of object $d_o(i,j)$ at location (i,j) as measured by a sensor and depth of surface $d_s(i,j)$ at the (i,j) position as determined by the aforementioned plane fitting; and $\Delta X(i,j) = X_o(i,j) - X_o(i-1,j)$, $\Delta Y(i,j) = Y_o(i,j) - Y_o(i,j-1)$ are physical sizes corresponding to an area imaged by pixel (i,j) in real-world coordinates obtained by calculating deltas along X and Y axes between pixel (i,j) and its neighboring pixels, angle correction delta $\Delta Z(i,j)$ is a function of $\cos\varphi$, $\cos\theta$, $\cos\omega$ and $d_s(i,j)-d_o(i,j)$.

6. The method of claim 1, further comprising:
retrieving a model of said object from a database; and
using said model to refine said volume estimation.

7. The method of claim 1, further comprising:
receiving a user input as to a type of said object; and
using said input to refine said volume estimation.

8. The method of claim 7, wherein said object is a food item, further comprising estimating a volume of said food item.

9. A system for estimating a pose of a camera relative to a surface upon which a 3D object rests such that a volume can be estimated for that object in an image captured by that camera, said system comprising:
a memory; and
a processor in communication with said memory, said processor executing machine readable program instructions for performing the method of:
determining a matrix K from parameters intrinsic to a camera used to capture at least one image of an object for volume estimation purposes;
determining a camera translation vector $T=[t_X t_Y t_Z]$ relative to a set of real-world reference coordinates in (X,Y,Z);
determining a camera rotation matrix R from camera angles ($\varphi,\theta,\omega$) relative to the X, Y and Z axis, respectively, of said real-world reference coordinates, wherein said camera translation and said camera rotation are determined from depth values associated with pixels of a surface of said object, said depth values being measured by a depth sensor of said camera; and
estimating a distance $Z_c$ of said camera, comprising:

$$Z_c \begin{bmatrix} i \\ j \\ 1 \end{bmatrix} = KR \begin{bmatrix} X \\ Y \\ Z \end{bmatrix} + KT^T$$

wherein K comprises:

$$K = \begin{bmatrix} f_1 & \alpha f_1 & c_1 \\ 0 & f_2 & c_2 \\ 0 & 0 & 1 \end{bmatrix},$$

where $f_1$ and $f_2$ are focal lengths of a lens of said camera in each of two directions, $\alpha$ is a non-zero skew of a sensor of said camera, and $c_1$ and $c_2$ are center positions of said camera in pixels,
and; wherein R comprises:

$$R = \begin{bmatrix} 1 & 0 & 0 \\ 0 & \cos\varphi & -\sin\varphi \\ 0 & \sin\varphi & \cos\varphi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\omega & -\sin\omega & 0 \\ \sin\omega & \cos\omega & 0 \\ 0 & 0 & 1 \end{bmatrix}.$$

10. The system of claim 9, wherein a 2-dimensional surface model is fitted to said measured depth values of said surface.

11. The system of claim 9, further comprising providing instructions to an operator of said camera to rotate said camera so that a rotation thereof approximates a rotation angle any of: (90°, 90°, 0°), (90°, 0°, 90°), and (0°, 90°, 90°), said instructions being based on a depth distribution of said surface.

12. The system of claim 9, further comprising computing the real-world coordinates XYZ of the surface at each pixel location (i,j), $X_S(i,j), Y_S(i,j), Z_S(i,j)$, or the real-world coordinates XYZ of an object rested on said surface at each pixel location (i,j), $X_O(i,j), Y_O(i,j), Z_O(i,j)$, using said equation in claim 1 and the depth output $d_s(i,j)$ or $d_O(i,j)$ from the depth sensor of said surface or said object in an image captured by said camera.

13. The system of claim 9, further comprising estimating a volume V of an object in an image captured by said camera, said volume comprising:

$$V = \sum_{(i,j)\in\Omega} \Delta Z(i,j) \cdot \Delta X(i,j) \cdot \Delta Y(i,j),$$

where $\Omega$ is a set of pixel locations of object in said image; $\Delta Z(i,j)=Z_s(i,j)-Z_o(i,j)$ is an angle-corrected delta between depth of surface of object $d_o(i,j)$ at location (i,j) as measured by a sensor and depth of surface $d_s(i,j)$ at the (i,j) position as determined by the aforementioned plane fitting; and $\Delta X(i,j)=X_o(i,j)-X_o(i-1,j)$, $\Delta Y(i,j)=Y_o(i,j)-Y_o(i,j-1)$ are physical sizes corresponding to an area imaged by pixel (i,j) in real-world coordinates obtained by calculating deltas along X and Y axes between pixel (i,j) and its neighboring pixels, angle correction delta $\Delta Z(i,j)$ is a function of $\cos \phi$, $\cos \theta$, $\cos \omega$ and $d_s(i,j)-d_o(i,j)$.

14. The system of claim 9, further comprising:
retrieving a model of said object from a database; and
using said model to refine said volume estimation.

15. The system of claim 9, further comprising:
receiving a user input as to a type of said object; and
using said input to refine said volume estimation.

16. The system of claim 15, wherein said object is a food item, further comprising estimating a volume of said food item.

* * * * *